United States Patent
Andrus et al.

(10) Patent No.: US 7,337,120 B2
(45) Date of Patent: Feb. 26, 2008

(54) PROVIDING HUMAN PERFORMANCE MANAGEMENT DATA AND INSIGHT

(75) Inventors: Garth R. Andrus, Flower Mound, TX (US); Charles Nebolsky, Northbrook, IL (US); Matthew J. Majer, New York, NY (US); Ryan M. LaSalle, Chicago, IL (US); Eric R. Miller, Grapevine, TX (US); Peter W. Park, East Rutherford, NJ (US); Janet A. Tafoya, Chicago, IL (US); Anouk Trudel, Montreal (CA)

(73) Assignee: Accenture Global Services GmbH, Neuhausen am Rheinfall (CH)

( * ) Notice: Subject to any disclaimer, the term of this patent is extended or adjusted under 35 U.S.C. 154(b) by 1069 days.

(21) Appl. No.: 10/072,551

(22) Filed: Feb. 7, 2002

(65) Prior Publication Data
US 2003/0149614 A1    Aug. 7, 2003

(51) Int. Cl.
*G06Q 99/00*    (2006.01)
(52) U.S. Cl. .......................................................... 705/1
(58) Field of Classification Search ..................... 705/1
See application file for complete search history.

(56) References Cited

U.S. PATENT DOCUMENTS

| | | | |
|---|---|---|---|
| 6,032,141 A * | 2/2000 | O'Connor et al. | 706/45 |
| 6,115,690 A * | 9/2000 | Wong | 705/7 |
| 6,343,275 B1 * | 1/2002 | Wong | 705/26 |
| 6,944,596 B1 * | 9/2005 | Gray et al. | 705/1 |
| 6,983,263 B1 * | 1/2006 | Demko et al. | 705/80 |
| 2001/0011211 A1 * | 8/2001 | Bushey et al. | 703/22 |
| 2002/0069189 A1 * | 6/2002 | Bertrand et al. | 706/45 |
| 2002/0111887 A1 * | 8/2002 | McFarlane et al. | 705/30 |
| 2002/0129139 A1 * | 9/2002 | Ramesh | 709/224 |
| 2003/0009373 A1 * | 1/2003 | Ensing et al. | 705/10 |
| 2003/0101091 A1 * | 5/2003 | Levin et al. | 705/11 |
| 2003/0187723 A1 * | 10/2003 | Hadden et al. | 705/11 |
| 2003/0187853 A1 * | 10/2003 | Hensley et al. | 707/10 |
| 2004/0095378 A1 * | 5/2004 | Vigue et al. | 345/723 |

* cited by examiner

*Primary Examiner*—Jonathan Ouellette
(74) *Attorney, Agent, or Firm*—Fish & Richardson P.C.

(57) ABSTRACT

A method that includes obtaining human performance related data from at least one remotely located application service provider, organizing the data into at least one metric, preparing an interpretation of the data and providing interactive, on-line access to the data and the interpretation.

22 Claims, 21 Drawing Sheets

BioSys

PERFORM/REWARD

LOGOUT - HELP
JOHN SULLIVAN
AUGUST 14, 2000 - 8:56 AM

HOME

↙ 708

| CREATE: | MODIFY: | REPORT: | SNAPSHOT: | | | |
|---|---|---|---|---|---|---|
| | | | ITEM | COMPLETE | TOTAL | PERCENTAGE |
| DISTRIBUTE GOALS | UPDATE PROGRESS MODIFY GOALS | GOAL REPORT APPRAISAL/360 REPORT | SURVEYS | 4 | 4 | 100% |
| CREATE APPRAISAL | VIEW GOALS PERFORM ASSESSMENT | VIEW PUBLISHED REPORT | GOALS | 8 | 8 | 100% |
| CREATE GOAL | VIEW APPRAISAL | COMP. MGMT. REPORT | APPRAISALS | 2 | 9 | 22% |
| CREATE SURVEY PUBLISH SURVEY | TAKE SURVEY MODIFY | | TOTAL | 12 | 21 | 57% |
| CREATE CATEGORIES | COMPETENCY VIEW COMPETENCY | | | | | |

GOAL
THE GOAL MODULE SUPPORTS THE SETTING OF PERFORMANCE STANDARDS USING GOALS

360
360 IS USED FOR UPWARD/DOWNWARD FEEDBACK

APPRAISAL
APPRAISAL IS FOR EMPLOYEE ASSESSMENTS

SURVEY
SURVEY ALLOWS

COMPETENCY MANAGEMENT
COMPETENCY MANAGEMENT ENABLES ORGANIZATION OF PERFORMANCE CRITERIA

ABOUT BIOSYS

FIG. 7E

BioSys

CREATE INDIVIDUAL GOAL

HOME - PERFORM/REWARD

LOGOUT - HELP
JOHN SULLIVAN
AUGUST 14, 2000 - 8:56 AM

/ 710

GOAL NAME:
INCREASE SALES

CREATION DATE:
08-14-2000

TYPE:
○ SHORT TERM
● LONG TERM

COMPLETION DATE:
SEPTEMBER ▼ 14 ▼ , 2001 ▼

METRIC INFLUENCES:
TRAINING HOURS TAKEN
OF NEW CUSTOMERS
REFERRALS OFFERED
CUSTOMER SATISFACTION RATING
% DEPLOYED TIME
% OF BUDGETED TRAINING TAKEN
GROUP TURNOVER RATE
% REFERRALS HIRED

DESCRIPTION:
ACHIEVE $200,000 IN SALES IN ONE YEAR'S TIME.

[CLEAR]  [REGISTER GOAL]

ABOUT BIOSYS

FIG. 7F

PERFORM/REWARD — LOGOUT - HELP — JOHN SULLIVAN — AUGUST 14, 2000 - 9:02 AM

HOME

CREATE:
DISTRIBUTE GOALS
CREATE APPRAISAL
CREATE GOAL
CREATE SURVEY
PUBLISH SURVEY

CREATE CATEGORIES

MODIFY:
UPDATE PROGRESS
MODIFY GOALS
VIEW GOALS
PERFORM ASSESSMENT
VIEW APPRAISAL
TAKE SURVEY
MODIFY
COMPETENCY
VIEW COMPETENCY

REPORT:
GOAL REPORT
APPRAISAL/360 REPORT
VIEW PUBLISHED REPORT
COMP. MGMT. REPORT

SNAPSHOT: /712

| ITEM | COMPLETE | TOTAL | PERCENTAGE |
|---|---|---|---|
| SURVEYS | 4 | 4 | 100% |
| GOALS | 8 | 9 | 89% |
| APPRAISALS | 2 | 9 | 22% |
| TOTAL | 12 | 22 | 55% |

GOAL
THE GOAL MODULE SUPPORTS THE SETTING OF PERFORMANCE STANDARDS USING GOALS

360
360 IS USED FOR UPWARD/DOWNWARD FEEDBACK

APPRAISAL
APPRAISAL IS FOR EMPLOYEE ASSESSMENTS

SURVEY
SURVEY ALLOWS

COMPETENCY MANAGEMENT
COMPETENCY MANAGEMENT ENABLES ORGANIZATION OF PERFORMANCE CRITERIA

ABOUT BIOSYS

FIG. 7G

BioSys

SUBMIT COURSE FEEDBACK

HOME - DEVELOP/RETAIN

LOGOUT - HELP
JOHN SULLIVAN
AUGUST 14, 2000 - 9:04 AM

─ 716

COURSE:
EXECUTIVE TIME MANAGEMENT

COURSE NUMBER:
3342

REQUIRED:
NO

DATE(S) ATTENDED:
07-31-2000 TO 08-04-2000

CLASSROOM:
1 ○
2 ○
3 ●
4 ○
5 ○

COURSE MATERIALS:
1 ○
2 ○
3 ○
4 ●
5 ○

INSTRUCTOR:
1 ○
2 ●
3 ○
4 ○
5 ○

OVERALL:
1 ○
2 ●
3 ○
4 ○
5 ○

ADDITIONAL COMMENTS:
ALTHOUGH THE MATERIALS WERE VERY THOROUGH, I DIDN'T GET MUCH OUT OF ATTENDING THIS COURSE. ALSO, SINCE THE MATERIALS ARE AVAILABLE ONLINE FOR 1/3 COST OF PHYSICALLY ATTENDING, I'D DEFINITELY RECOMMEND GOING THAT ROUTE.

[CLEAR]   [SUBMIT FEEDBACK]

ABOUT BIOSYS

FIG. 7I

BioSys

ETM HOME

LOGOUT - HELP
JOHN SULLIVAN
AUGUST 14, 2000 - 9:08 AM

718

| INDIVIDUAL |
| GROUP |
| ENTERPRISE |

SCORECARD

| OPERATIONS: | | CUSTOMER VALUE: | |
|---|---|---|---|
| NONDEPLOYED PERCENTAGE | G | NUMBER OF NEW CUSTOMERS | Y |
| DEVELOPMENT RATE | Y | CUSTOMER SATISFACTION RATING | G |
| INNOVATION: | | FINANCIAL RESULTS: | |
| LEADING-EDGE TECHNOLOGY SALES | Y | PERCENT INCREASE IN GLOBAL SALES | G |
| USE OF ONLINE DEVELOPMENT | G | PROPOSED PROJECT REVENUE | G |

METRIC

ADMIN

| NAME | SET | AVG | IND |
|---|---|---|---|
| % OF GOALS ACHIEVED | 100% | 84% | 100% |
| % OF COURSE FEEDBACK COMPLETED | 100% | 92% | 67% |
| % OF ON TIME APPRAISALS | 100% | 45% | 94% |
| % DEPLOYED TIME | 80% | 71% | 82% |

INTENTIONS

ATTRACT/SELECT → PERFORM/REWARD / DEVELOP/RETAIN / DEPLOY/REDEPLOY

TALENT EVENTS

| WEEK | MONTH | YEAR |

SURVEY: COMMUNICATION    08-15-2000  ✓

ABOUT BIOSYS

FIG. 7J

BioSys

CREATE GROUP SURVEY
HOME - PERFORM/REWARD
TOPIC
EMPLOYEE INSIGHT
SURVEY NAME:     SURVEY GROUP:
BIOSYS SATISFACTION     [SULLIVAN03: 'SALES REPS' ▼]

LOGOUT - HELP
JOHN SULLIVAN
AUGUST 14, 2000 - 9:12 AM

CREATION DATE:
08-14-0000 09:26 AM

/— 724

QUESTION SCALE:     PUBLICATION DATE:
[1-5 ▼] (1=STRONGLY AGREE)    [AUGUST ▼] [14 ▼], [2000 ▼]

REQUIRED:
NO ● YES ○
DUE DATE:
[AUGUST ▼] [28 ▼], [2000 ▼]

QUESTION 1:
[I AM SATISFIED WITH MY CURRENT COMPENSATION.]    ALLOW ADDITIONAL COMMENTS? ● YES ○ NO

QUESTION 2:
[I CAN ACCOMPLISH MY CAREER GOALS AT BIOSYS.]    ALLOW ADDITIONAL COMMENTS? ● YES ○ NO

QUESTION 3:
[I HAVE HAD ADEQUATE TRAINING OPPORTUNITIES.]    ALLOW ADDITIONAL COMMENTS? ● YES ○ NO

QUESTION 4:
[I WOULD CONSIDER MYSELF ACTIVE IN THE EMPLOYEE MENTORING PROGRAM.]    ALLOW ADDITIONAL COMMENTS? ● YES ○ NO

QUESTION 5:
[I RECEIVE ADEQUATE, ON TIME PERFORMING FEEDBACK.]    ALLOW ADDITIONAL COMMENTS? ● YES ○ NO

QUESTION 6:
[I AM HAPPY WITH THE LEVEL OF INTEROFFICE COMMUNICATION.]    ALLOW ADDITIONAL COMMENTS? ● YES ○ NO

QUESTION 7:
[I AM SATISFIED WITH THE AMOUNT OF OVERTIME I AM WORKING.]    ALLOW ADDITIONAL COMMENTS? ● YES ○ NO

QUESTION 8:
[I FEEL I AM CHALLENGED IN MY CURRENT POSITION.]    ALLOW ADDITIONAL COMMENTS? ● YES ○ NO

QUESTION 9:
[I AM SATISFIED WITH THE CURRENT FACILITIES AND EQUIPMENT I NEED TO.]    ALLOW ADDITIONAL COMMENTS? ● YES ○ NO

QUESTION 10:
[I FEEL MY IDEAS AND CONTRIBUTION ARE VALUED.]    ALLOW ADDITIONAL COMMENTS? ● YES ○ NO

ADD A SECTION FOR GENERAL COMMENTS? ● YES ○ NO    [RESET DEFAULT] [SUBMIT SURVEY]

ABOUT BIOSYS

FIG. 7M

BioSys
ETM HOME

LOGOUT - HELP
JOHN SULLIVAN
AUGUST 14, 2000 - 9:26 AM

INDIVIDUAL
GROUP
ENTERPRISE

*726*

SCORECARD | METRIC
--- | ---

OPERATIONS: | CUSTOMER VALUE:

| | | | |
|---|---|---|---|
| TURNOVER RATE | Y | PERCENTAGE OF REPEAT CUSTOMERS | Y |
| HR COST AS PERCENTAGE OF SALES | G | NUMBER OF NEW ALLIANCES | G |

INNOVATION: | FINANCIAL RESULTS:

| | | | |
|---|---|---|---|
| RESEARCH AND DEVELOPMENT PRODUCT PIPELINE | Y | EARNINGS PER SHARE | Y |
| NUMBER OF B2B TRANSACTIONS | G | NET PROFIT PER EMPLOYEE | G |

ADMIN

| NAME | SET | AVG | IND |
|---|---|---|---|
| % OF TEMPORARY EMPLOYEES | 4% | 6% | 4% |
| % OF EXPERIENCED HIRES | 60% | 73% | 62% |
| % OF OPEN POSITIONS | 6% | 8% | 7% |
| OFFER ACCEPTANCE RATE | 57% | 43% | 61% |
| TURNOVER OF HIGH PERFORMERS | 8% | 7% | 8% |
| % OF INTERNAL PROMOTIONS | 70% | 56% | 67% |

INTENTIONS | TALENT EVENTS

WEEK | MONTH | YEAR

ATTRACT/SELECT
PERFORM/REWARD
DEVELOP/RETAIN
DEPLOY/REDEPLOY

SURVEY: COMMUNICATION   08-15-2000 ✓

ABOUT BIOSYS

FIG. 7N

PROVIDING HUMAN PERFORMANCE MANAGEMENT DATA AND INSIGHT

BACKGROUND

The invention relates to a human performance management and insight system.

Organizations can be driven to achieve business goals. They may allocate substantial time, money, and manpower to establish, track, and influence such goals.

Establishing business goals can be difficult and costly. Organizations may be required to assemble data from several disparate sources, synthesize and analyze the data, and develop conclusions based on the analysis. It can be challenging to accomplish these tasks in a timely manner.

Tracking progress toward such goals can also be difficult and costly. This may require exhaustive processing of data and preparing timely updates of progress can be time consuming and expensive.

Influencing progress toward business goals can also be very challenging. Causal relationships between various metrics can be very complex and difficult to understand. Managers in organizations may require years of experience to develop an understanding of these relationships. Decisions that are made based on information may be incorrect if, for example, the information is not provided in a timely fashion or the analysis is incorrect. It can also be difficult to coordinate a particular individual's efforts to best support an organization's progress toward its established goals.

SUMMARY OF THE INVENTION

In a first aspect, a method is disclosed that includes obtaining human performance related data from at least one remotely located application service provider, organizing the data into metrics, preparing an interpretation of the data, and providing interactive, on-line access to the data and to the interpretation. Human performance related data might also be obtained from at least one locally stored application. An individual accessing the data may customize the metrics. The method may further include maintaining a historical record of the data. The data may be organized at an individual level, a group level and an enterprise level. The method may also include identifying whether a predetermined set point value for data has been exceeded. The method may include comparing the data to a predetermined goal value. The method may also include calculating a projected cost savings that could be realized if the data were equal to the value of the predetermined goal. Preparing the interpretation may include determining a recommended action based on the data. The method can include providing access to at least one intention based link. The metrics may be further organized into categories.

In a second aspect, a system is disclosed that includes at least one remotely located application service provider and a local processor device. The local processor device is configured to obtain human performance related data from the at least one remotely located application service provider, organize the human performance related data into at least one metric, prepare an interpretation of the human performance related data organized into at least one metric, and provide interactive, on-line access to the human performance related data organized into at least one metric and to the interpretation. The system may also include at least one locally stored application, which the processor device may obtain human performance related data from. The metrics may be customizable by a user. The processor device may be further configured to organize the data at an individual level, a group level, and an enterprise level. The processor device may also be configured to identify if a predetermined set point value for the data organized into metrics has been exceeded. The processor device can also maintain historical records of the data. The processor device may also compare the data to a predetermined goal value and calculate projected cost savings that could be realized if the value of the data is equal to the value of the predetermined goal. The processor device might also identify a recommended action for the user based on the data. The processor device may be further configured to organize the at least one metric into at least one category. In another aspect, an apparatus is disclosed that includes a processor and a memory unit. The processor is configured to obtain human performance related data from at least one remotely located application service provider, organize the human performance related data into at least one metric, prepare an interpretation of the human performance related data, store the human performance related data in the memory unit, and provide interactive, on-line access to the human performance related data and the interpretation. The processor might also obtain the human performance related data from at least one locally stored application. The metrics may be customizable by a user. The processor might organize the human performance related data at an individual level, a group level and an enterprise level. The processor may be further configured to identify if a predetermined set point value for the data has been exceeded. The processor also might maintain an historical record of the data organized into the at least one metric. The processor may further be configured to compare data values with values of predetermined goals. The processor might also calculate projected cost savings that could be realized if the value of the data were equal to the value of the predetermined goal. The processor might also identify recommended actions based on the data. The metrics might be further divided into categories by the processor.

In yet another aspect, an article is disclosed. The article can include a computer-readable medium that stores computer executable instructions for causing a computer system to obtain human performance related data from at least one remotely located application service provider, organize the human performance related data into at least one metric, prepare an interpretation of the human performance related data and provide interactive, on-line access to the human performance related data and to the interpretation. The article may further include instructions for causing the computer system to obtain human performance related data from at least one locally stored application. The article may also include instructions for causing the computer system to enable a user to customize the at least one metric. The article can also include instructions for causing the computer system to organize the data at an individual level, a group level and an enterprise level. The article might include instructions for causing the computer system to identify if a predetermined set point value for the human performance related data organized into the at least one metric has been exceeded. The article can further include instructions for causing the computer system to maintain a historical record of the human performance related data. The article might also include instructions for causing the computer system to compare a value of the data with a value of a predetermined goal. The article can further include instructions for causing the computer system to calculate a projected cost savings that could be realized if the value of the data is equal to the value of the predetermined goal. The article might also include instructions for causing the computer system to identify a recommended action based on the human performance related data. The article might also include instructions for causing a computer system to organize the at least one metric into at least one category.

DETAILED DESCRIPTION OF THE DRAWINGS

Figure 1A:
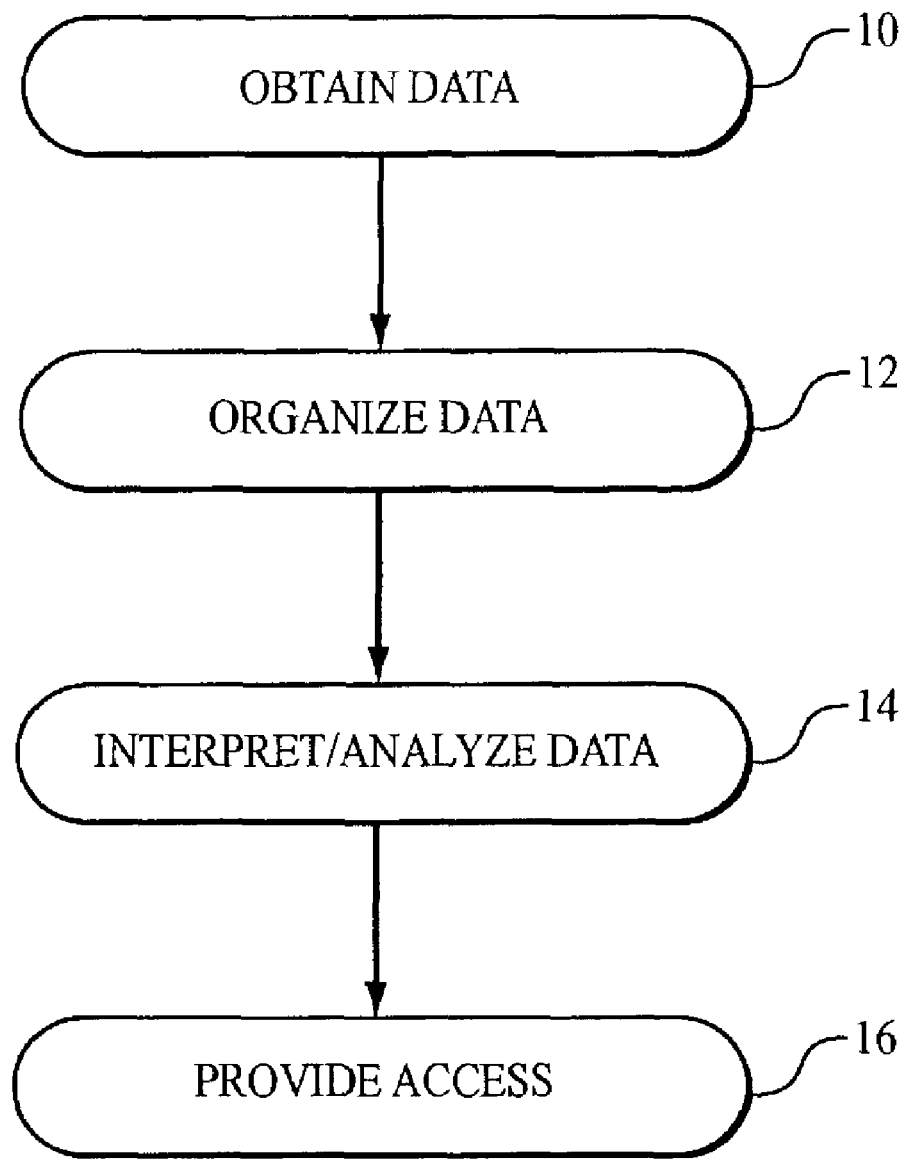
FIGS. 1A, 1B and 6 are flowcharts according to the invention.

FIG. 1A is a flowchart detailing a method according to a particular embodiment of the invention. A computer-based human performance management and insight system can obtain 10 human performance related data from one or more sources. These sources might include, for example, one or more remotely located application service providers (ASPs) connected to the system through the Internet or some other network. These sources may also include local application servers.

The system might also organize 12 the data into various categories, such as, various metrics. Metrics include performance indicators, such as, number of new customers, employee turnover rate, and customer satisfaction ratings.

The system might also interpret 14 the data and provide insightful decision support information to users based on the data. Such interpretation includes, for example, identifying functional relationships between different metrics, identifying when predetermined limits on metrics are exceeded, and identifying recommended actions based on the data.

The system might also provide access 16 to such organized data, and interpretations to users that access system through, for example, a computer connected to a network.

Figure 1B:
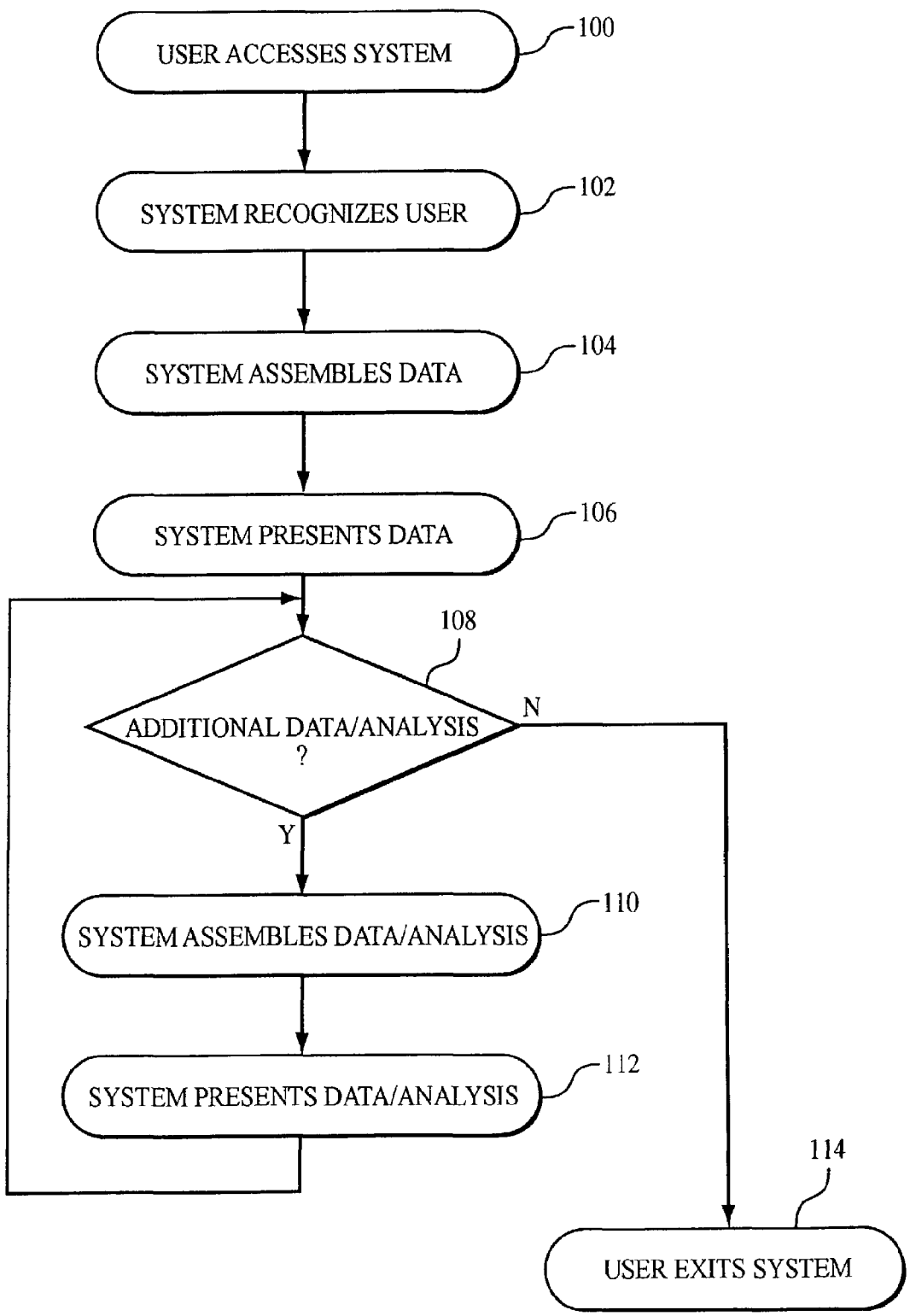

FIG. 1B illustrates a flowchart detailing the interactions of a user accessing an implementation of a human performance management and insight system. The user can access 100 the human performance management and insight system by logging in, for example, through a website on the Internet. The system may recognize 102 the user, for example, by examining a password entered by the user. The system may then assemble 104 human performance related data from one or more local application servers and one or more remote application service providers through the Internet or some other network. An application service provider may provide access, for example, to an application or data.

The system presents 106 the data to the user who may then review the data presented. The user then determines 108 whether additional data, or analysis of any data is desired. If so. the user can make an appropriate selection from a number of options to indicate the specific data or analysis desired. Based on the user's selection, the system assembles 110 the additional data and analysis of the data. The system then presents this additional data and analysis to the user. If no further data or analysis is required, the user can exit 114 the system.

Figure 2:
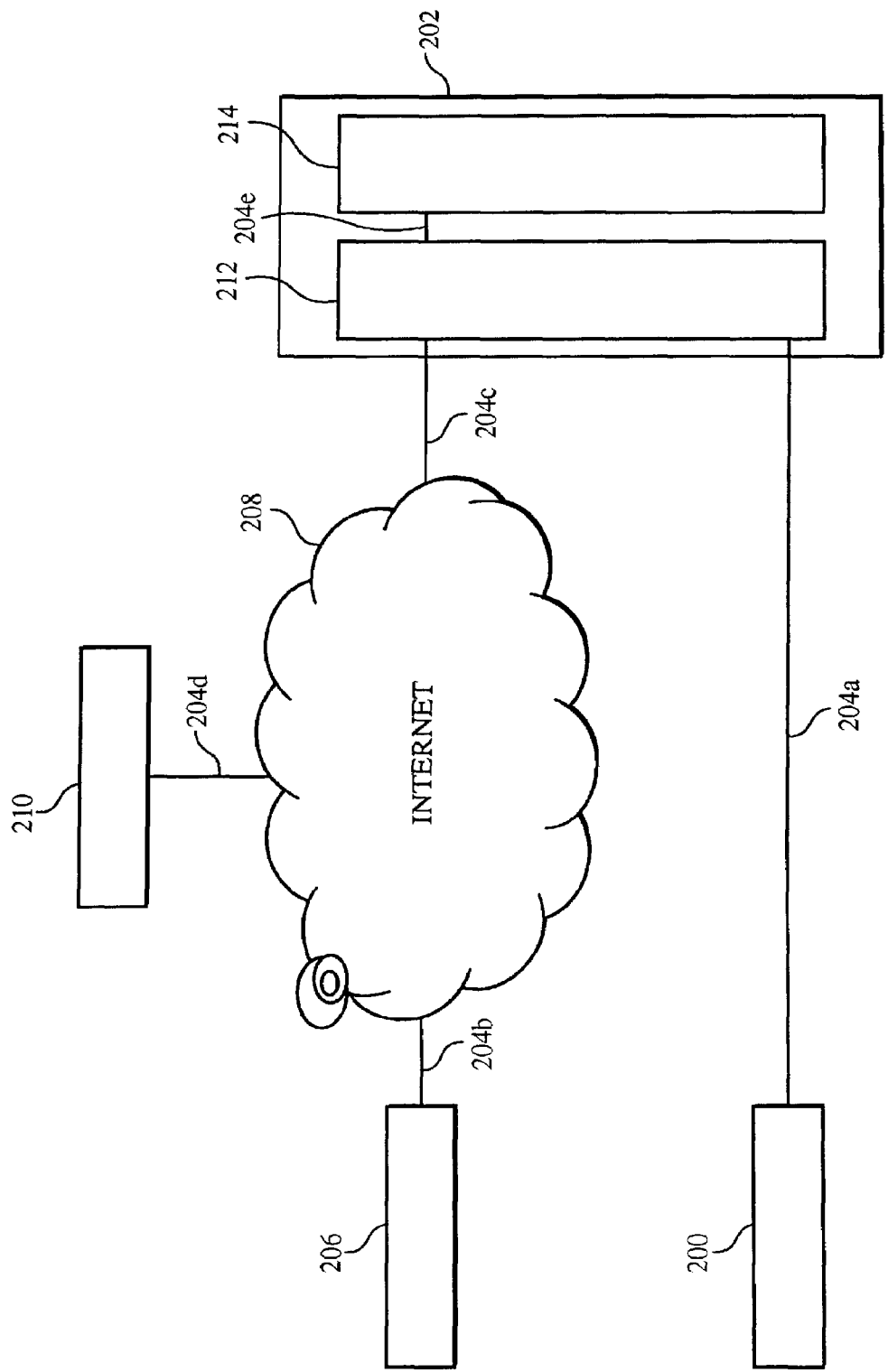
FIGS. 2, 3, 4 and 5 are block diagrams of systems according to the invention.

As shown in the particular implementation of FIG. 2, users may access system 202 through computers 200, 206, which may be, for example, personal computers or laptop computers. Such computers would generally include a web browser. Computer 200 is connected to system 202 through duplex communications channel 204a. A duplex communication channel may be, for example, a direct line connection, a wireless connection, or a connection using the Internet. A user accessing the system through computer 200 can typically realize maximum dynamic functionality of the system 202.

Computer 206 is connected through the Internet 208 and duplex communication channels 204b, 204c to system 202. A user accessing system 202 through computer 206 may, for example, receive web-based static reporting available through browser delivery as standalone web pages either by scheduled replication for later viewing or by email broadcasts. Intranet users, such as a user at computer 200, typically gain access to the system by entering a username or a password. Internet users, such as a user at computer 206, typically would be required to use a 128-bit or higher web browser in order to access system 202.

In this example implementation, system 202 can be configured to obtain human performance related data from remotely located application service provider (ASP) 210 through the Internet 208 and duplex communication channels 204c, 204d. System 202 can organize the human performance related data into metrics, prepare an interpretation of the data organized into metrics, and provide interactive, on-line access to the data organized into metrics and the interpretation to users at computers 200, 206. System 202 may also include local servers and databases containing applications such as Oracle or SAP from which it obtains data.

System 202 includes two distinct architectural environments 212 and 214, each of which performs specific functions. Execution environment 212 includes processors and memory devices arranged to implement the techniques described herein. More specifically, execution environment 212 includes a collection of run-time services, machines and supporting infrastructure upon which software runs. Execution environment 212 provides an interface for users at computers 200, 206 to access system 202 to obtain human performance related data and analyses. Execution environment 212 typically also incorporates system security functions.

Operation environment 214 includes a collection of run-time services, machines and supporting infrastructure that manage execution environment 212. Components within operation environment 214 may, for example, monitor and balance loading, backup critical system data, monitor data traffic, monitor batch interfaces, manage key process scheduling, and manage configuration of components within execution environment 212. Operation environment 214 also typically manages system 202 administrative tasks, such as creating, deleting or modifying data. Typically only components within operation environment 214 can obtain access to operation environment 214 functions and appropriate security measures may be implemented to limit access accordingly.

Users at computers 200, 206 are connected to execution environment 212, and would not normally be afforded access to information or components within operation environment 214. Execution environment 212 and operation environment 214 may be located either near each other in the same facility, or far from each other in different facilities. They may be coupled to one another by duplex communications channel 204e.

Figure 3:
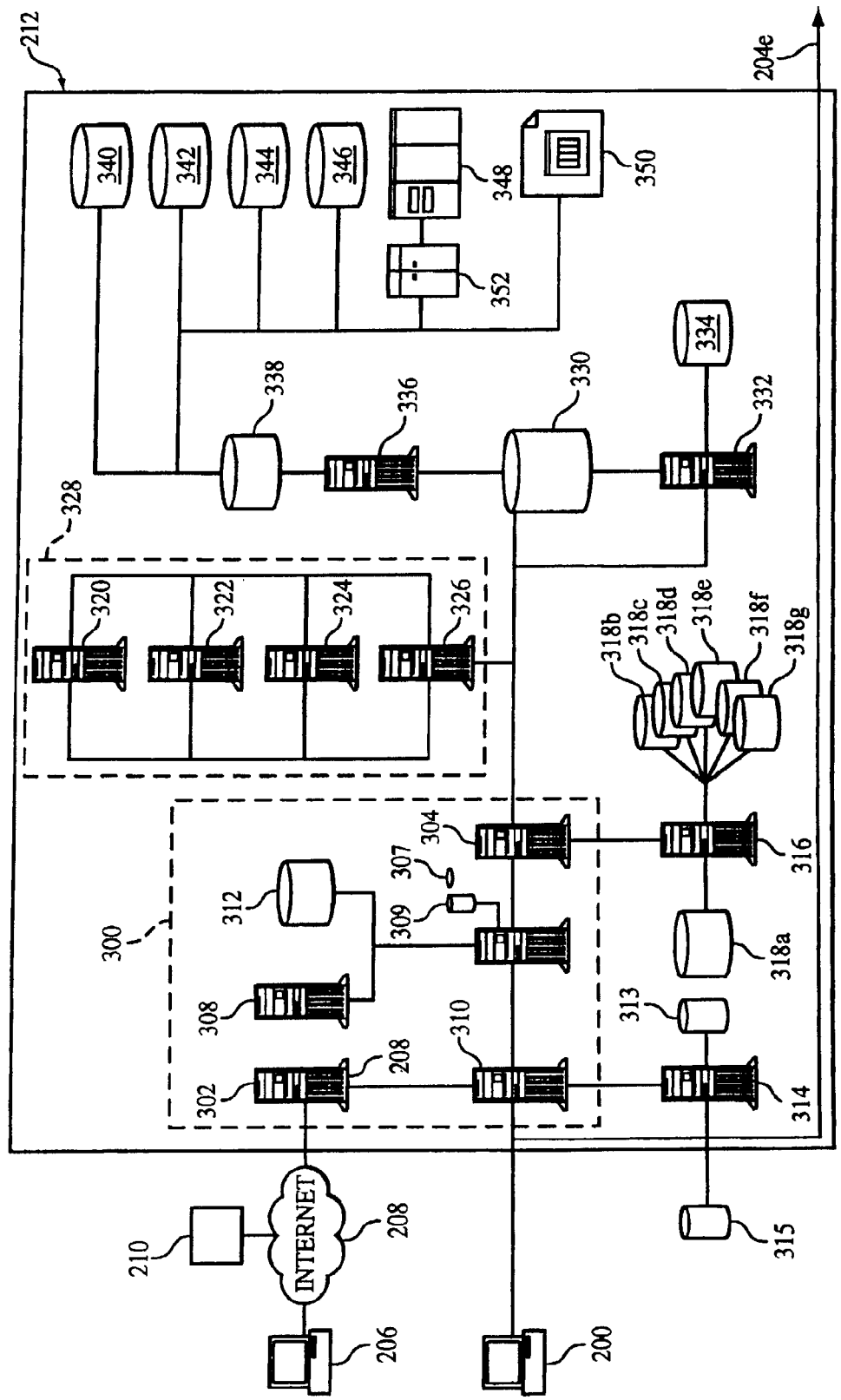

Referring now to the particular implementation of FIG. 3, each user computer 200, 206 interfaces with the execution environment 212 through a collection of components known collectively as demilitarized zone 300. Computer 206 can access execution environment 212 through firewall server 302 in demilitarized zone 300. Firewall server 302 can be configured to prevent certain users at computers connected to the Internet from accessing web servers, application servers, content servers or other components in execution environment 212. Firewall server 302 is an entry point into execution environment 212 for Hypertext Transfer Protocol (HTTP) requests that arrive through the Internet 208. Firewall server 302 may utilize publicly addressable Internet protocol (IP) technology to determine whether a particular HTTP signal should be allowed to pass. It also may prevent access to the Internet from certain computers and components located within execution environment 212.

Firewall server 302 and computer 200 are connected to web server 310. Web server 310 brokers transactions between users at computers 200, 206 and execution environment 212. Web server 310 manages publication and presentation of information sent by application server 306. Web server 310 processes HTTP requests, maintains communications between computers 200, 206 and the execution environment 212, and allows for new information to be registered and sent to computers 200, 206.

Application server 306 provides access to business logic software stored at application database 312. This business logic software includes business rules and procedures that are used to develop interpretations of and insight related to human performance data. Application server 306 may also manage some execution environment 212 back-end functions such as application of business intelligence, personalization of system access privileges, and data mining.

A computer readable medium, such as disk 307, might store computer executable instructions for causing the system to accomplish either all or some of the techniques described herein. Disk 307 could be inserted into a drive 309 connected to application server 306.

Director/security server 308 typically stores user-specific directory, demographic, and system access privilege information. Director/security server 308 can be queried upon initial connection to determine a user's access privileges and security capabilities. Director/security server 308 may also maintain tables containing user information that is not application specific, for example, user name, address, phone, and email. A user's security capabilities may be applicable across the entire execution environment 212 and might specify, for example, a user's messaging, database access, and document retrieval abilities. A user may only be required to log on once to gain access to a variety of applications.

Firewall server 304 provides an interface between demilitarized zone 300 and several other components within execution environment 212. Firewall server 304 typically restricts access beyond it to any component other than application server 306 or director/security server 308.

Media server 314 is connected to web server 310 and can deliver streaming audio and video to computers 200, 206. Streaming audio and video enables high fidelity communications between computers 200, 206 and execution environment 212. Streaming audio and video accessed through media server 314 can be stored on local databases 313 or remote databases 315. Users at computers 200, 206 can access media server 314 through presentation codes delivered by web server 310. Media server 314 can be accessed using protocols such as, for example, user datagram protocol (UDP) or network news transfer protocol (NNTP).

Content management/personalization server 316 is connected to firewall 304 and provides user management services for team-based production, delivery, and maintenance of electronic documents. Content management/personalization server 316 enables system-wide sharing of electronic resources, for example, word processing documents, presentation documents, spreadsheets, text files, and html pages by implementing Internet presentation technologies. Content management/personalization server 316 can control personalization of execution environment data to protect intellectual property. It can implement version control functions to manage multi-user access to documents, and can provide overall content management, such as managing web page uploads from content databases with minimal administrative monitoring. Content management/personalization server 316 can also track user data such as visit length, content viewed, and visit frequency and can help generate reports specific to a particular user. Content management/personalization server 316 can also assist with workflow capability and can interface with email systems.

Content management/personalization server 316 is connected to several databases 318*a*, 318*b* . . . 318*g* that store various information. Such databases may include, for example, personalization rules, application profiles, session data, member data, transaction data, and content databases. Although seven databases are shown, more or less could be used.

Execution environment 212 also includes a collection 328 of business intelligence tools that include performance management (PM) forecasting server 320, PM reporting server 322, online analytical processing (OLAP)/querying server 324, and balanced scorecard server 326, connected as shown. Other business intelligence tools may be included in collection 328.

PM forecasting server 320 can enable execution environment 212 to analyze "what if" scenarios based on metric analysis and to analyze complex decision support scenarios. Such analysis may be accomplished by utilizing, for example, simulation based modeling, historical trending, cross metric relationship predicting, and history based modeling or proprietary predictive modeling schemes. PM forecasting server 320 can provide a wizard-based, walk-through discussion of, for example, definitions, trends, and events. It can provide side-by-side performance comparisons of data and metrics and can integrate user-defined calculations. It can also incorporate historical data into forecasting analyses, and utilize data mining technologies.

PM reporting server 322 can deliver predefined measures and recommendations based on data to authorized users in a business report format. PM reporting server 322 typically coordinates collecting, formatting, and organizing of data to support metric monitoring. PM reporting server 322 is typically not configured for raw data retrieval, query and analysis or simulation or forecasting. Instead, it interfaces with and coordinates other servers to perform these functions. PM reporting server 322 can deliver summary reports including metrics, and relevant financial information. It can perform drill-down analysis by hierarchal, regional, or other business structures related to a particular metric. PM reporting server 322 can include "slice and dice" filtering capabilities to view data from alternate perspectives. It can perform graphical analysis of current trends, and benchmark/target comparisons. It can identify metric performance thresholds such as best and worst metrics in a given class.

On-line analytical processing (OLAP)/querying server 324 can retrieve, format and present data stored in data warehouse 330. OLAP /querying server 324 typically includes quantitative engines that provide drill-down analysis capability to users. Such drill-down analysis capabilities provide metric details sometimes needed to create reports for system wide rollout or ad hoc analysis.

Balanced scorecard server 326 can link metrics to corporate-level strategic initiatives. By using real-time metrics and personalized settings for users, balanced scorecard server 326 can provide metric status symbols and trend scores. Users can typically access up to the minute metrics that describe progress towards predefined strategic goals.

Database server 332 provides the collection 328 of business intelligence tools with access to information from execution environment back end databases, local data warehouse 330, and external data warehouse 334. Database server 332 can edit, or delete information from such data sources. It typically includes summary table creating capabilities and data management capabilities, for example, computing sums, averages and counting. It can manage system resources and help balance OLAP/querying server 324 loading. It can enable the collection 328 of business intelligence tools to retrieve and manipulate data in data warehouse 330. It can enable operationally simple access control, and may incorporate mechanisms such as indexing that can speed up data retrieval functions. Database server 332 can manage physical data storage and provide backup and restart/recovery support. It also can help support transaction processing for distributed data sources.

Data Warehouse 330 is typically a read only repository of corporate data and transactional data that has been primed for online analysis and data mining. Data Warehouse 330 may include, for example, multiple centrally located datamarts, departmental databases and any other combination of data sources or staging servers. Datamarts are subsets of a data warehouse, such as data warehouse 330. A specific subject area, department, location, user class or business category typically defines each datamart. Datamarts are typically constructed from single data sources and are often maintained as separate modular sources for analytical purposes. Datamarts may be highly indexed to facilitate searching functions. They may be developed iteratively to match a specific user's requirements.

Data Warehouse 330 typically enables enterprise-wide decision support. Data may be organized with minimal indexing to allow for high volumes of access to data with multiple users accessing data simultaneously. Data may be organized according to a star schema to optimize data scanning speeds. Data aggregation can accommodate creating hierarchal views of metrics. Data Warehouse 330 typically supports the integration of operational (enterprise level) and strategic (industry level) data, and can support metadata (data about data) storage and organization.

Extract/Cleanse and Transform/Load (ETL) server 336 can access data from multiple sources and applications and apply business rules to resolve inconsistencies of data syntax, definition and format. Exception handling and metadata collection can be performed concurrently with transactional data processing. The ETL server loads data into the data warehouse 330.

ETL server 336 interfaces with staging area 338. Staging area 338 includes a data cache memory used for temporary storage of data before being transferred to data warehouse 330. Users at computers 200, 206 cannot normally access information in staging area 338. Staging area 338 may be, for example, a relational database management system (RDBMS) or a flat file directory.

Staging area 338 can interface with a variety of data sources and processors including operational data store (ODS) 340, metadata repository 342, SAP database 344, enterprise resource planning (ERP) database 346, legacy application server 348 through batch processing device 352, and flat file 350.

ODS 340 is an interim holding area for transactional data before being passed to staging area 338. Data is updated in ODS 340 on a real-time basis using standard formats. Data can come from various data sources or through a user entering data at computers 200, 206. ODS 340 may be designed to assist back-end systems to meet performance, scalability, or real time data acquisition requirements.

Metadata repository 342 is a database that contains metadata, or "data about data". Descriptions of both transactional and legacy metadata is located in this database and may be referenced for index sorting, data mining and querying.

The group of data sources also includes SAP application 344 and other ERP data sources 346, such as PeopleSoft. The ERP data sources may operate on top of an Oracle type database.

Batch processing device 352 can manage batch data updates between legacy application server 348 and other components within execution environment 212. Batch processing device 352 may not be configured to handle real-time requests to execution environment 212. Batch processing device 352 typically executes, monitors, manages, and processes requests from execution environment 212. It also provides a control structure and framework for batch programs. It may also automatically recover and restart batch programs if they fail.

Figure 4:
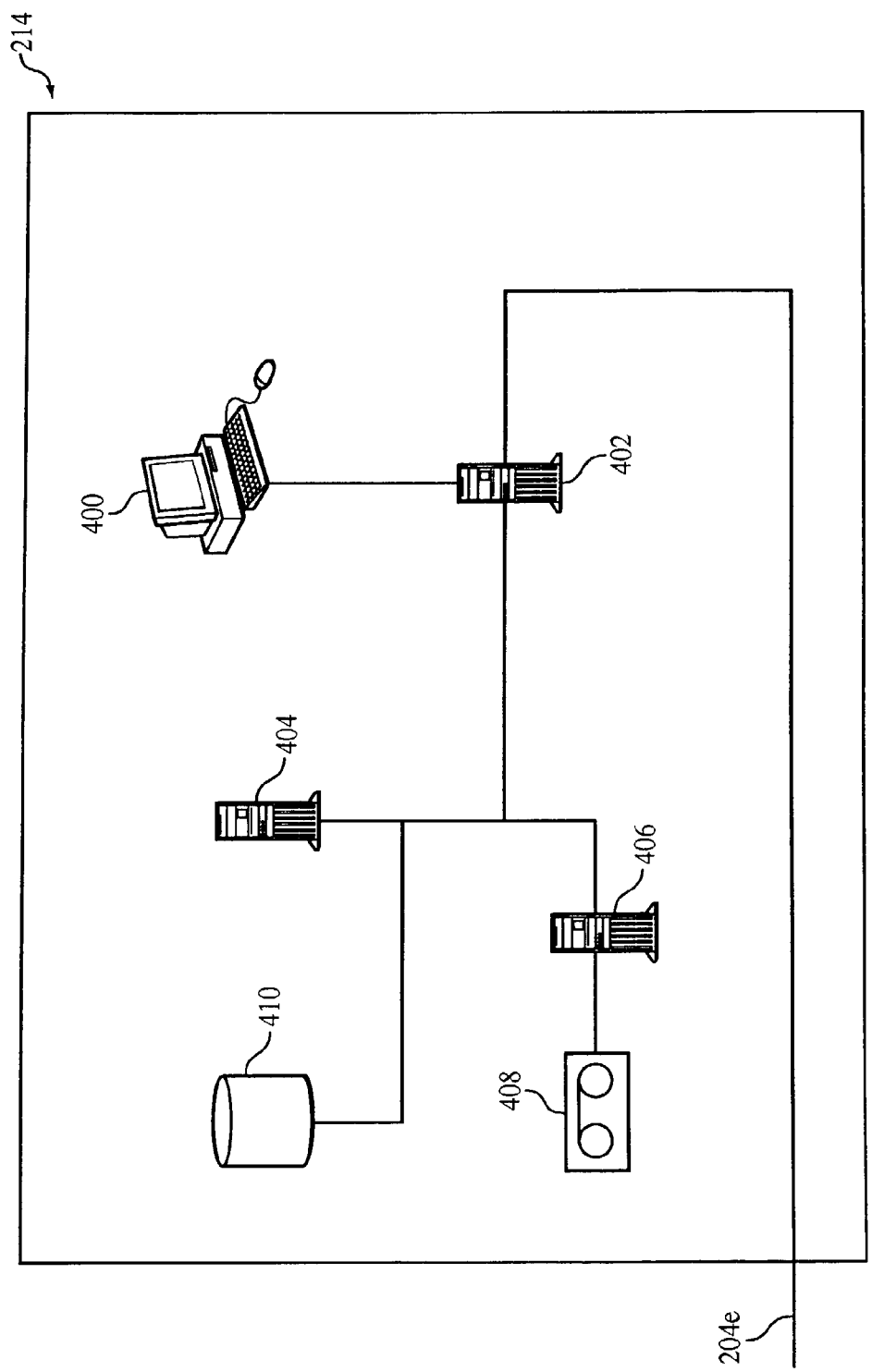

Referring now to the operations environment 214 of FIG. 4, a systems administrator can access operation environment 214 through administration computer 400. This computer 400 can be used to monitor, administer, maintain and configure execution environment 212 and operation environment 214.

Administration computer 400 interfaces with web/application/directory/security/ (WADS) server 402. WADS server 402 typically brokers transactions between operation environment 214 and execution environment 212. It can store various applications, user-specific information, and information related to user access privileges.

Load balancing server 404 can monitor and balance loading and data traffic at components in both operation environment 214 and execution environment 212. It can also assist with key process scheduling.

Backup server 406 can backup critical data from both operation environment 214 and execution environment 212 and save it to memory device 408, which may be a tape backup array.

Operation environment 214 also includes a local operational database 410, used to store varied data, as required.

Figure 5:
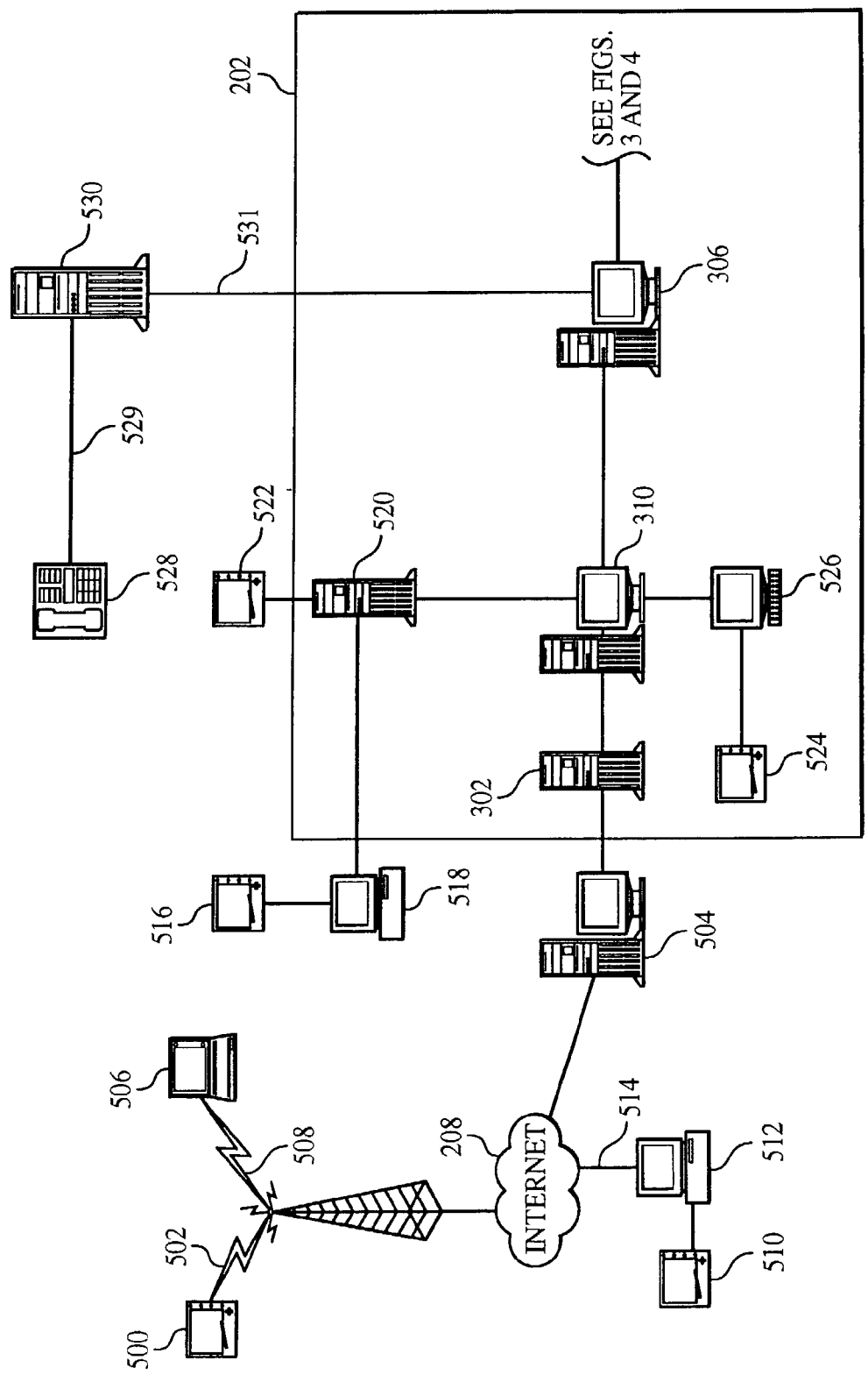

As shown in FIG. 5 users can access system 202 using a variety of possible methods. For example, a user may access the system using personal digital assistant (PDA) 500, for example, a Palm Pilot through wireless connection 502 to the Internet 208. The Internet 208 may be connected through mirror web server 504 to firewall server 302 and web server 310. Alternatively, a user may access system 202 using wireless laptop computer 506 connected by wireless connection 508 to the system in a similar manner as PDA 500.

A user might access system 202 through mobile PDA 510 directly connected to personal computer 512, which uses dial up connection 514 to access the Internet 208.

A user might access system 202 through PDA 516 connected to personal computer 518 that is connected to a Remote Access Service (RAS) server 520. Alternatively, a user may access system 202 through PDA 522 connected directly to RAS server 520.

Another method of connecting to the system includes utilizing PDA 524 and connecting to personal computer 526, which is connected directly to web server 310. Personal computer 526 may be part of system 202.

Alternatively, system 202 may be adapted to permit a user to access system 202 through telephone 528 that dials in to interactive voice response (IVR) system 530, which accesses system 202 through telephone lines 529 and 531 and application server 306.

Figure 6:
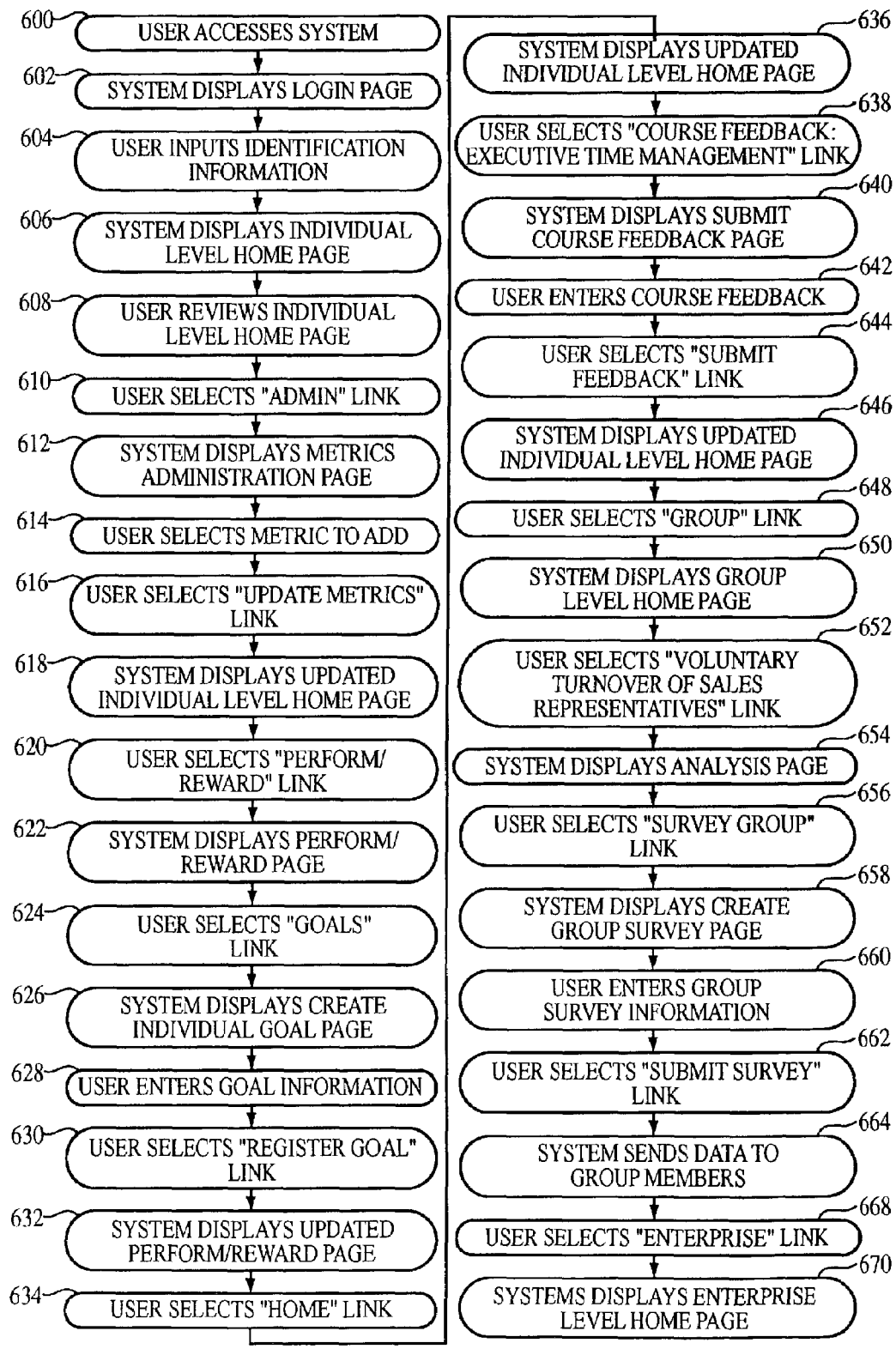
Figure 7A:
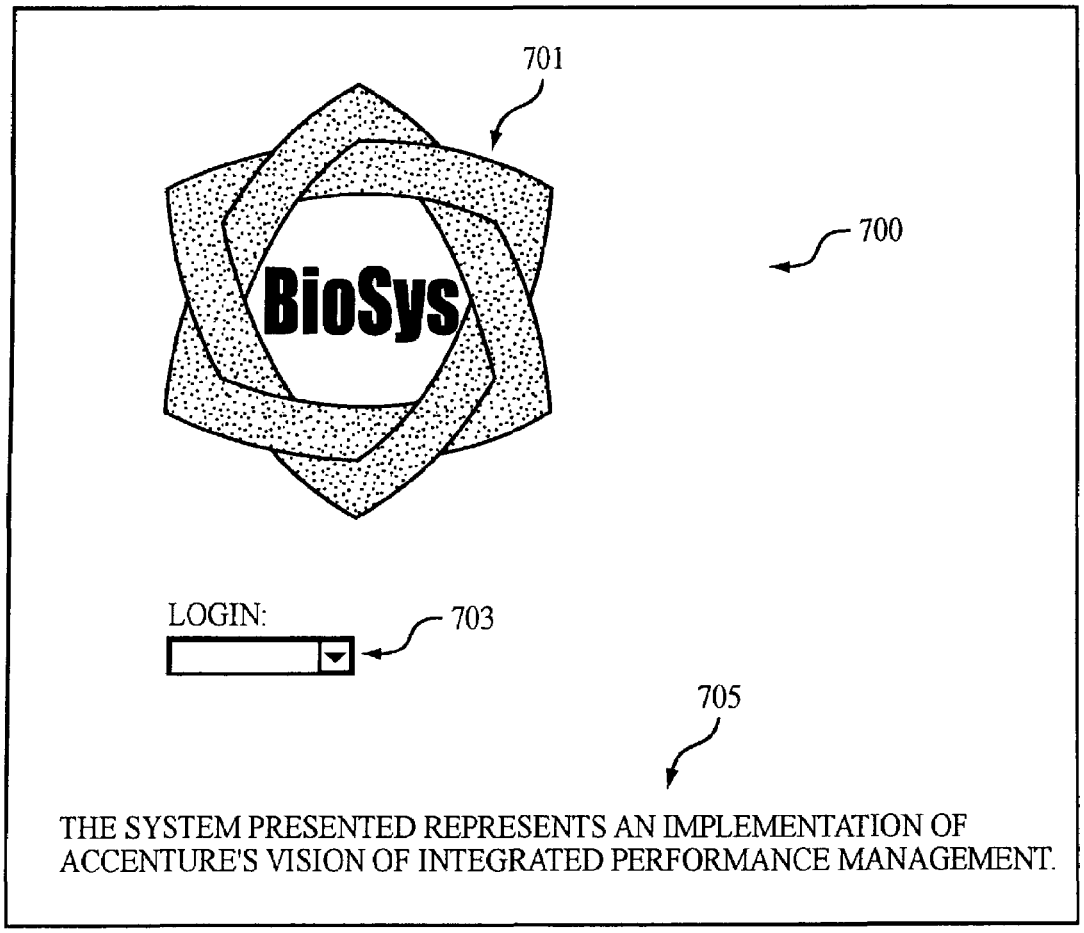
FIGS. 7A-7N are screenshots detailing a particular implementation of the invention.

Cross referenced FIGS. 6 and 7A through 7N illustrate a particular scenario wherein a user interacts with a particular embodiment of a system according to the invention. A user can access 600 the system by, for example, selecting a link from a corporate home page. The system then displays 602 a login page 700, illustrated in FIG. 7A. Login page 700 includes a company's logo 701, a field 703 for entering a user's identification information and a message 705 about the system. The field for entering user identification information may include a drop down menu with user names, etc in it. The user can input 604 the necessary identification information in the appropriate field and select enter.

Figure 7B:

After the user logs in, the system displays 606 individual level home page 702, as illustrated in FIG. 7B. Individual level home page 702 includes a scorecard section, a metrics section, an intentions section, and a talent events section. The scorecard section allows the user to perform a high level check of workforce metrics. Examples of workforce metrics include nondeployed percentage, development rate, number of new customers, customer satisfaction rating, leading edge technology sales, use of online development, percent increase in global sales, and proposed project revenue. Each workforce metric can be classified in a particular organization area, for example, operations, customer value, innovation, and financial results. Each metric also includes a symbol next to it identifying the status of the user's performance in each metric. The scorecard organization areas and list of metrics would typically be defined by a company and would not be modifiable by a user.

The metrics section of individual level home page 702 includes a list of personalized metrics. A user can select these metrics for viewing. These metrics include three indicator columns: set, average (AVG), and individual (IND). The set column indicates the ideal value for a given metric. The average column can indicate either an industry or company wide average for a specific metric. The individual column indicates the individual user's specific performance in a particular metric.

The intentions section allows users the ability to navigate through the system based on a talent management intention rather than by a specific task. For example, a user who intends to recruit candidates would select the "attract/select" module in the intentions section. Sub-level intention pages include more detailed and directed areas or tasks within an area.

The talent events section of individual level home page 702 includes a list of tasks related to talent management for a user. Each task listed in the talent events section may be a link, which when selected may cause the system to display a document to the user that the user is working on. This document will typically be related to the specific task identified by the link.

Figure 7C:
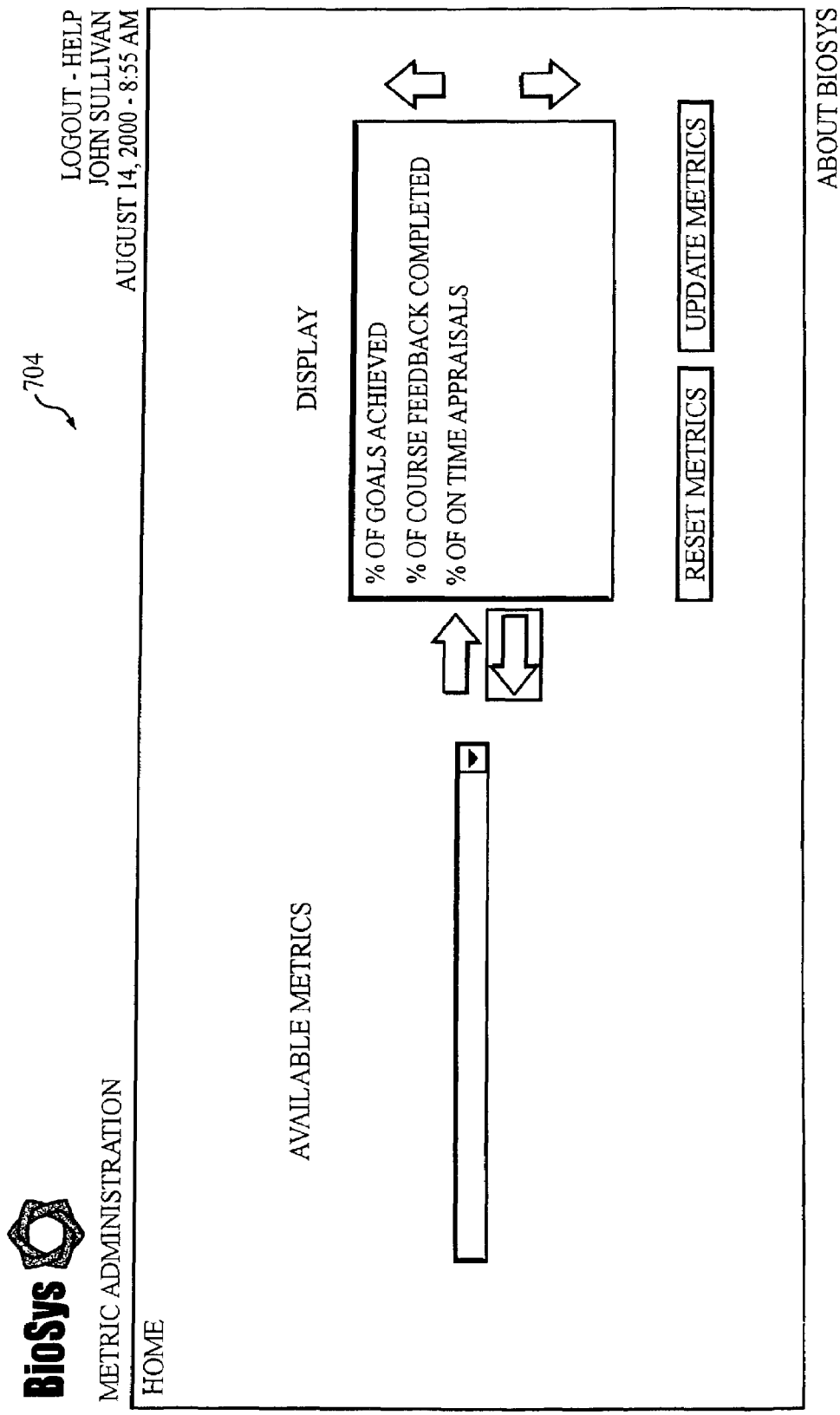

The user might review 608 all the information on the page 702. After reviewing the information, the user may decide to add a particular metric to the metrics section of the page 702. To do so, a user would select 610 the "Admin" link in the metrics section of the page 702. This would cause the system to display 612 metric administration page 704 as shown in FIG. 7C.

Metric Administration page 704 includes a field containing a drop down menu for selecting metrics from a list of available metrics. It also includes a list of metrics set to be displayed on individual level home page 702. The arrows oriented facing left and right allow a user to move particular metrics from one field to another, and the up and down facing arrows allow a user to page through a long list of metrics. The user can select 614 a metric to add, such as the "% Deployed Time" metric and then select 616 the "Update Metrics" link.

Selecting the "Reset Metrics" link directs the system to reset the displayed metrics list to include a default set of metrics. Selecting the "Update Metrics" link causes the system to display 618 an individual level home page 706, as illustrated in FIG. 7D, updated to reflect the changes made.

Figure 7D:
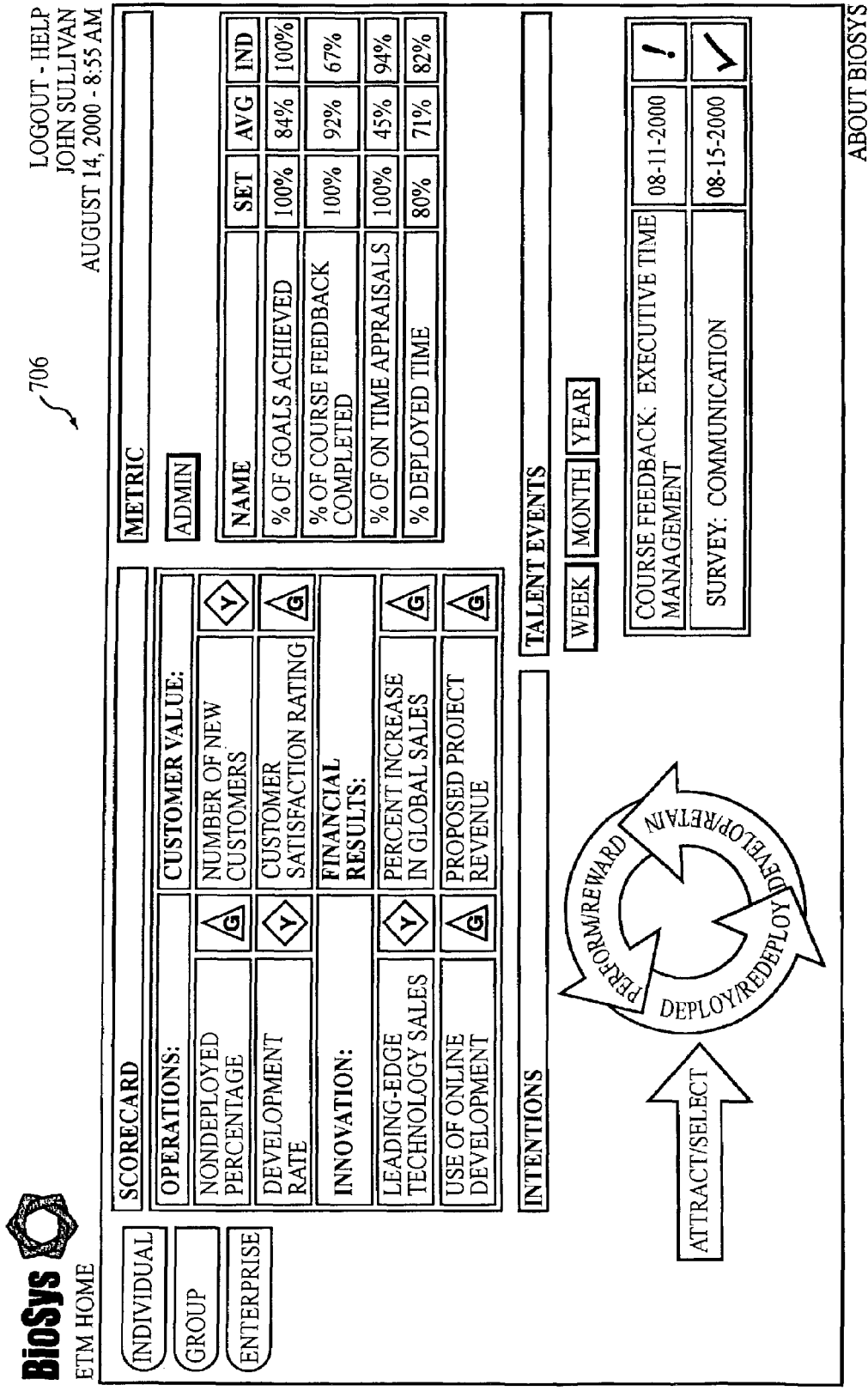

FIG. 7D illustrates an individual level home page 706, updated with respect to individual level home page 702 to reflect an added metric "% deployed time" that has been added to the metrics section. The system has also updated other relevant data in that section.

If a user wishes, he may use the system to set and track personal goals. For example, if a user has a goal of achieving $200,000 in sales in one year, he might select 620 the "Perform/Reward" link from individual level homepage 706. This causes the system to display 622 perform/reward page 708, as illustrated in FIG. 7E. Perform/reward page 708 includes a snapshot section indicating the user's performance in several categories, namely, surveys, goals, and appraisals. It also includes numerous links to topics and information related to performance and rewards. Perform/reward page 708 also includes a number of definitions of relevant terminology.

To add a new goal, the user selects 624 the "goals" link under the "create" heading. This causes the system to display 626 create individual goal page 710 of FIG. 7F.

Create individual goal page 710 includes a fields where the user can enter a title of the goal, type of goal (long term or short term), a projected completion date, different metric influencers, and a description of the goal. The user enters 628 the pertinent goal information and selects 630 the "register goal" link. Selecting the "register goal" link causes the system to display 632 a perform reward page 712 as shown in FIG. 7G, with a snapshot section updated to reflect the new goal.

Figure 7H:
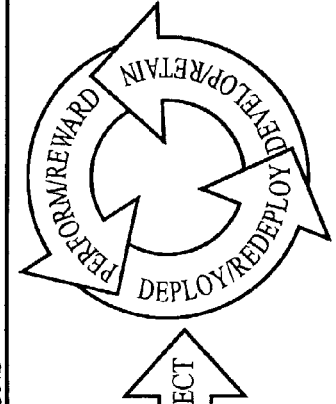

The user may return to individual level home page 714, shown in FIG. 7H, by selecting 634 the "home" link near the top of perform/reward page 712. The individual level home page 714 of FIG. 7H is identical to the individual level home page 706 of FIG. 7D with the exception that the "% of goals achieved" metric has been updated to read 89% under the IND column. This indicates the addition of the newly added goal.

The talent events section of individual level home page 714 includes an indicator next to the item "Course feedback: executive time management" showing that it is overdue. This item may be a link. A user may select 638 the link, causing the system to display 640 submit course feedback page 716 as shown in FIG. 7I.

Submit course feedback page 716 includes a number of parameters to be rated and an area for the user to enter additional comments. The user can enter 642 course feedback and select 644 the "submit feedback" link when finished entering the required feedback. Selecting the "submit feedback" link causes the system to display 646 individual level home page 718 as shown in FIG. 7J. Individual level home page 718 no longer includes the "course feedback" item in the talent events section of the page.

Figure 7K:
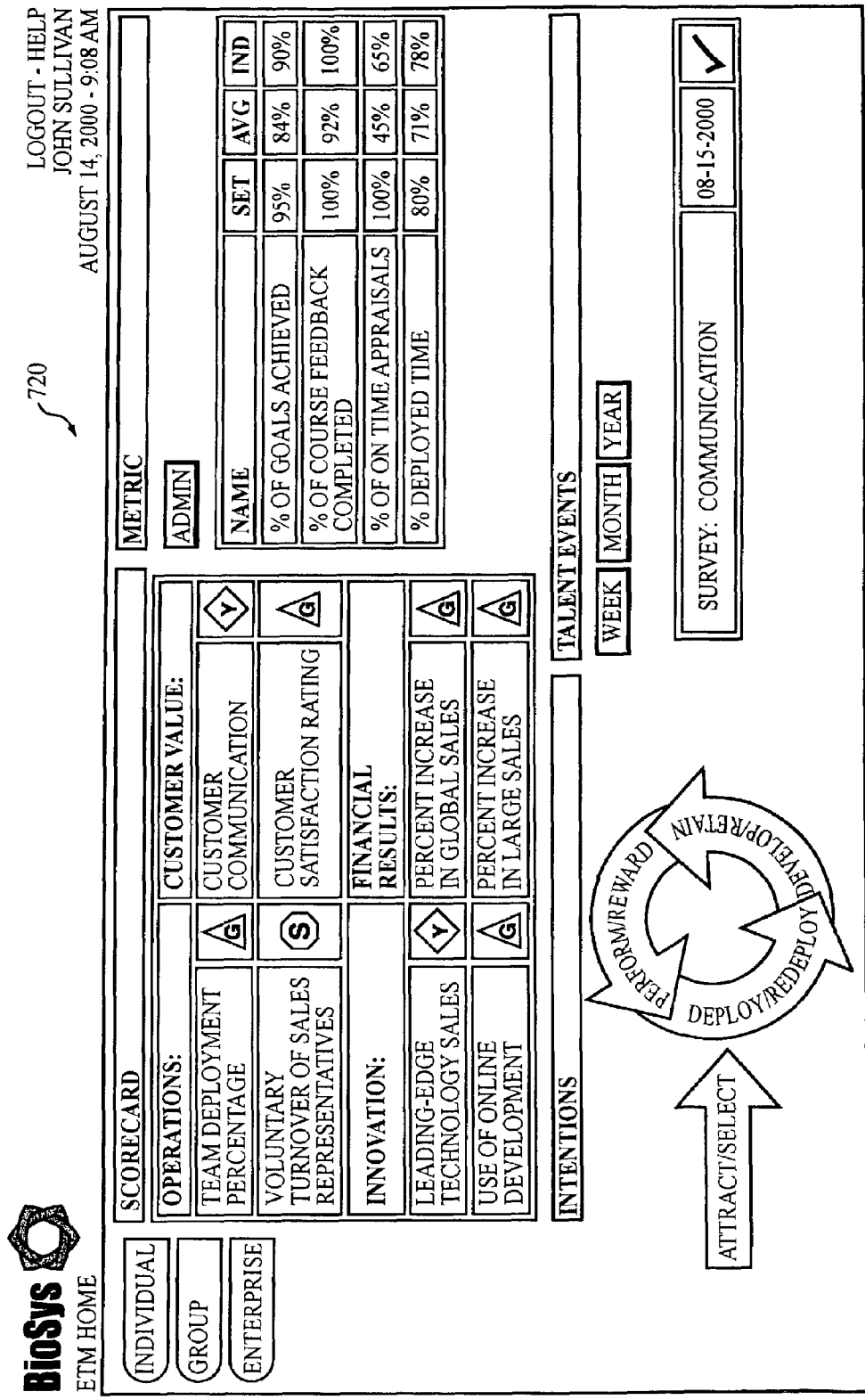

The user may choose to access system information at a group level. A group may be a particular department or team in an organization dedicated to performing and focusing on specific problems, issues and tasks. The user can select 648 the "group" link at the side of individual level home page 718. Selection of this link causes the system to display 650 group level home page 720 as shown in FIG. 7K.

Figure 7L:

Group level home page 720 includes information and tasks similar to those included in individual level home page 702, except directed towards a particular group's activities. Review of group level home page 720 indicates that the metric titled "voluntary turnover of sales representatives" exceeded a predetermined value. The user can select 652 a link to more information about that particular metric, which causes the system to display 654 analysis page 722 as shown in FIG. 7L.

Analysis page 722 includes a graph detailing a groups historic performance in a given metric category, a list of metric influencers, a list of related metrics with information related to their performance, and recommended actions to help improve the group's performance. Analysis page 722 may also include a discussion of issues related to the group's performance with respect to the subject metric. The graph may include a goal set, for example, by company executives, and an industry benchmark for comparison to other companies within a given industry. Additionally, analysis page 722 includes an estimate of the cost savings that might be realized by the organization if the goal for the given metric is reached.

Based on a recommended action listed on analysis page 722, a user may decide to survey the group. The "survey group" action may be a link, and the user may select 656 that link. Selection of that link may cause the system to display 658 create group survey page 724 as shown in FIG. 7M. On that page, the user can enter 660 any number of questions that will be sent to each member of the group. The user can then select 662 the "submit survey" link, which causes the system to send 664 the survey to all members in the group.

The user can also access an enterprise level home page 726 as shown in FIG. 7N and review data at an enterprise level. That page can be accessed when a user selects 668 an enterprise tab, for example, at the side of group level home page 720. Selection of the tab causes the system to display 670 enterprise level home page 726.

Enterprise level home page 726 includes sections similar to those discussed above with regards to individual level home page 702 (FIG. 7B) and group level home page 720 (FIG. 7K), except that the information is directed to an entire enterprise, organization, company, etc.

Various features of the system may be implemented in hardware, software or a combination of hardware and software. For example, some aspects of the system can be implemented in computer programs executing on programmable computers. Each program can be implemented in a high level procedural or object-oriented programming language to communicate with a computer system. Furthermore, each such computer program can be stored on a storage medium, such as read-only-memory (ROM) readable by a general or special purpose programmable computer, for configuring and operating the computer when the storage medium is read by the computer to perform the functions described above.

Various modifications may be made. The actual format of the screens may be modified to reflect a particular user's desires. Additionally, the metrics and categories available may be modified. The system may be adapted to arrange the logical structure of its informational links in alternate ways. Also, the physical arrangement of components and the system architecture of an actual system may vary from what has been detailed herein. Various system functions may be consolidated on one or more machines.

It is to be understood that while the invention has been described in conjunction with the detailed description thereof, the foregoing description is intended to illustrate and not to limit the scope of the invention. Other implementations are within the scope of the following claims.

What is claimed is:

1. A method comprising:
   obtaining human performance related data from at least one remotely located application service provider;
   organizing the data into a plurality of metrics, the plurality of metrics including non-user-modifiable individual, group and enterprise workforce metrics each comprising an indicator of individual, group and enterprise performance toward predefined workforce business goals, respectively, and user-modifiable individual, group and enterprise metrics each comprising an indicator of individual, group and enterprise performance toward personalized business goals, respectively, the plurality of metrics organized by metric category;
   adding a user-modifiable individual, group or enterprise metric to the plurality of metrics;
   displaying a scorecard section operable to view the plurality of non-user-modifiable individual, group or enterprise workforce metrics;
   displaying a metric section operable to view the user-modifiable individual, group and enterprise metrics;
   displaying an intentions section operable to register a personalized business goal to be completed by a predetermined date and influenced by at least one of the plurality of metrics, and business goal data associated with the personalized business goal;
   preparing an interpretation of the data organized into the plurality of metrics based on the registered business goal data and the obtained human performance related data, the interpretation including an automatically determined recommended action that helps to complete the personalized business goal and an automatically calculated estimated cost savings to be realized when the personalized business goal is completed;
   displaying an analysis section operable to graphically display individual, group or enterprise performance of a metric category in comparison to an industry benchmark, and to display a list of metrics in the metric category and the recommended action or estimated cost savings; and
   generating a survey based upon the recommended action.

2. The method of claim 1 wherein obtaining human performance related data comprises obtaining the data from at least one locally stored application.

3. The method of claim 1 wherein organizing the data into at least one metric comprises maintaining a historical record of data organized into at least one metric.

4. The method of claim 1 wherein preparing the interpretation comprises identifying if a predetermined set point value for the data organized into at least one metric has been exceeded.

5. The method of claim 1 wherein preparing the interpretation comprises comparing a value of the data with a value of a predetermined goal.

6. The method of claim 1, wherein the at least one of the plurality of metrics corresponds to a number of new customers, an employee turnover rate, a customer satisfaction rating, a non-deployed percentage, a development rate, a leading edge technology sales, a use of online development, a percent increase in global sales, and/or a proposed project revenue.

7. A system comprising:
   at least one remotely located application service provider; and
   a local processor device;
   wherein the processor device is configured to:
   obtain human performance related data from the at least one remotely located application service provider,
   organize the human performance related data into a plurality of metrics, the plurality of metrics including non-user-modifiable individual, group and enterprise workforce metrics each comprising an indicator of individual, group and enterprise performance toward predefined workforce business goals, respectively, and user-modifiable individual, group and enterprise metrics each comprising an indicator of individual, group and enterprise performance toward personalized business goals, respectively, the plurality of metrics organized by metric category,
   add a user-modifiable individual, group or enterprise metric to the plurality of metrics,
   display a scorecard section operable to view the plurality of non-user-modifiable individual, group or enterprise workforce metrics,
   display a metric section operable to view the user-modifiable individual, group and enterprise metrics,
   display an intentions section operable to register a personalized business goal to be completed by a predetermined date and influenced by at least one of the plurality of metrics, and business goal data associated with the personalized business goal,
   prepare an interpretation of the human performance related data organized into the plurality of metrics based on the registered business goal data and the obtained human performance related data, the interpretation including an automatically determined recommended action that helps to complete the personalized business goal and an automatically calculated estimated cost savings to be realized when the personalized business goal is completed,
   display an analysis section operable to graphically display individual, group or enterprise performance of a metric category in comparison to an industry benchmark, and to display a list of metrics in the metric category and the recommended action or estimated cost savings, and
   generate a survey based upon the recommended action.

8. The system of claim 7 further comprising at least one locally stored application, wherein the processor device is configured to obtain human performance related data from the at least one locally stored application.

9. The system of claim 7 wherein the processor device is further configured to identify if a predetermined set point value for the data organized into the at least one metric has been exceeded.

10. The system of claim 7 wherein the processor device is further configured to maintain an historical record of the data.

11. The system of claim 7 wherein the processor device is further configured to compare a value of the data with a value of a predetermined goal.

12. An apparatus comprising:
    a processor; and
    a memory unit;
    wherein the processor is configured to:
    obtain human performance related data from at least one remotely located application service provider,
    organize the human performance related data into a plurality of metrics, the plurality of metrics including non-user-modifiable individual, group and enterprise workforce metrics each comprising an indicator of individual, group and enterprise performance toward predefined workforce business goals, respectively, and user-modifiable individual, group and enterprise metrics each comprising an indicator of individual, group and enterprise performance toward personalized business goals, respectively, the plurality of metrics organized by metric category,
    add a user-modifiable individual, group or enterprise metric to the plurality of metrics,
    display a scorecard section operable to view the plurality of non-user-modifiable individual, group or enterprise workforce metrics,
    display a metric section operable to view the user-modifiable individual, group and enterprise metrics,
    display an intentions section operable to register a personalized business goal to be completed by a predetermined date and influenced by at least one of the plurality of metrics, and business goal data associated with the personalized business goal,
    prepare an interpretation of the human performance related data organized into the plurality of metrics based on the registered business goal data and the obtained human performance related data, the interpretation including an automatically determined recommended action that helps to complete the personalized business goal and an automatically calculated estimated cost savings to be realized when the personalized business goal is completed,
    display an analysis section operable to graphically display individual, group or enterprise performance of a metric category in comparison to an industry benchmark, and to display a list of metrics in the metric category and the recommended action or estimated cost savings, and
    generate a survey based upon the recommended action.

13. The apparatus of claim 12 wherein the processor is further configured to obtain the human performance related data from at least one locally stored application.

14. The apparatus of claim 12 wherein the processor is further configured to identify if a predetermined set point value for the data organized into the at least one metric has been exceeded.

15. The apparatus of claim 12 wherein the processor is further configured to maintain an historical record of the data organized into the at least one metric.

16. The apparatus of claim 12 wherein the processor is further configured to compare a value of the data with a value of a predetermined goal.

17. An article comprising a computer-readable medium that stores computer executable instructions for causing a computer system to:
    obtain human performance related data from at least one remotely located application service provider,
    organize the human performance related data into a plurality of metrics, the plurality of metrics including non-user-modifiable individual, group and enterprise workforce metrics each comprising an indicator of individual, group and enterprise performance toward predefined workforce business goals, respectively, and user-modifiable individual, group and enterprise metrics each comprising an indicator of individual, group and enterprise performance toward personalized business goals, respectively, the plurality of metrics organized by metric category, add a user-modifiable individual, group or enterprise metric to the plurality of metrics, display a scorecard section operable to view the plurality of non-user-modifiable individual, group or enterprise workforce metrics, display a metric section operable to view the user-modifiable individual, group and enterprise metrics, display an intentions section operable to register a personalized business goal to be completed by a predetermined date and influenced by at least one of the plurality of metrics, and business goal data associated with the personalized business goal, prepare an interpretation of the human performance related data organized into the plurality of metrics based on the registered business goal data and the obtained human performance related data, the interpretation including an automatically determined recommended action that helps to complete the personalized business goal and an automatically calculated estimated cost savings to be realized when the personalized business goal is completed, display an analysis section operable to graphically display individual, group or enterprise performance of a metric category in comparison to an industry benchmark, and to display a list of metrics in the metric category and the recommended action or estimated cost savings, and generate a survey based upon the recommended action.

18. The article of claim 17 further comprising instructions for causing the computer system to obtain human performance related data from at least one locally stored application.

19. The article of claim 17 further comprising instructions for causing the computer system to identify if a predetermined set point value for the human performance related data organized into the at least one metric has been exceeded.

20. The article of claim 17 further comprising instructions for causing the computer system to maintain a historical record of the human performance related data organized into the at least one metric.

21. The article of claim 17 further comprising instructions for causing the computer system to compare a value of the data with a value of a predetermined goal.

22. A method comprising:

adding a user-modifiable individual, group or enterprise metric to a plurality of metrics each comprising an indicator of individual, group or enterprise performance;

entering a business goal to be completed by a predetermined date and influenced by at least one of the plurality of metrics, and business goal data associated with the business goal;

obtaining human-performance related data from at least one remotely-located application service provider;

updating the plurality of metrics based on the human-performance related data;

updating a progress status of the entered business goal based on at least one of the updated plurality of metrics;

automatically determining a recommended action that helps to complete the entered business goal based on the human-performance related data and the entered business goal data;

automatically calculating, based on the entered business goal data and at least one of the updated plurality of metrics, a projected cost saving to be realized when the entered business goal is completed; and displaying an analysis section for the specified business goal, the analysis section operable to graphically display the progress status of the entered business goal, the recommended action, the projected cost saving, and the performance of at least one of the updated plurality of metrics in comparison to the entered business goal and/or an industry benchmark.

* * * * *